(12) United States Patent
Tai et al.

(10) Patent No.: US 6,411,745 B1
(45) Date of Patent: Jun. 25, 2002

(54) METHOD AND APPARATUS TO REDUCE CROSS-INTERFERENCE IN REPRODUCTION OF SCANNED HALFTONE IMAGES

(75) Inventors: Hwai-Tzuu Tai; Lori Overturf; Isaac Ishola Ajewole, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/606,634

(22) Filed: Feb. 26, 1996

Related U.S. Application Data

(63) Continuation of application No. 08/208,254, filed on Mar. 9, 1994, now abandoned.

(51) Int. Cl.$^7$ .................................................. G06T 5/00
(52) U.S. Cl. .......................... 382/300; 358/454; 358/458
(58) Field of Search ................................. 382/298, 299, 382/300; 358/454, 455, 456, 458, 460

(56) References Cited

U.S. PATENT DOCUMENTS

| | | | | |
|---|---|---|---|---|
| 4,486,785 A | * | 12/1984 | Lasher et al. | 358/455 |
| 4,803,558 A | * | 2/1989 | Hiratsuka et al. | 358/457 |
| 4,872,064 A | * | 10/1989 | Tutt et al. | 382/298 |
| 4,987,496 A | * | 1/1991 | Greivenkamp, Jr. | 358/454 |
| 5,200,831 A | * | 4/1993 | Tai | 358/457 |
| 5,276,535 A | * | 1/1994 | Levien | 358/458 |
| 5,285,291 A | * | 2/1994 | Schiller | 358/455 |
| 5,327,256 A | * | 7/1994 | Kang et al. | 382/299 |
| 5,333,064 A | * | 7/1994 | Seidner et al. | 382/299 |

\* cited by examiner

Primary Examiner—Jon Chang
(74) Attorney, Agent, or Firm—Norman Rushefsky

(57) ABSTRACT

A method and apparatus of reproducing an image in which an original image is scanned to produce a digital representation of the original image as a plurality of original pixels regularly located within the original image and each having a grey level value. Replacement pixels randomly located within boundaries of the original image are generated. The grey level values of the original pixels are interpolated and an interpolated grey level value is assigned to each of the replacement pixels. A reproduction of the original image is generated using only the replacement pixels and their assigned interpolated grey level values.

11 Claims, 4 Drawing Sheets

METHOD AND APPARATUS TO REDUCE CROSS-INTERFERENCE IN REPRODUCTION OF SCANNED HALFTONE IMAGES

This is a Continuation of application Ser. No. 08/208,254, filed Mar. 9, 1994 now abandoned.

FIELD OF THE INVENTION

The present invention is related to the field of document image processing, and particularly to methods and apparatus for reducing the scanning artifacts (Moire pattern) in a digital sampling process that are caused by cross interference patterns.

BACKGROUND OF THE INVENTION

Typical digital document/printing systems include several subsystems: scanner, image manipulation, image storage, image rendering, and printing subsystems. In the input scanner, there are several artifacts that are associated with the digital sampling process. For example, aliasing effects can cause jagged edges on text borders and Moire interference patterns on scanned halftone images. Furthermore, optical lens blurring will affect the sharpness of the image. Such artifacts affect image quality severely as these artifacts are propagated down the digital document copying/printing process.

A number of image processing methods and systems for enhancement of a digitized image have been developed to compensate for the imperfect degraded digital sampling process. (See, for example, U.S. Pat. No. 4,941,190 to Joyce). It is also known, from U.S. Pat. No. 4,194,221, to Stoffel, to provide for automatic reproduction of multimode originals containing continuous tone, halftone and line copy using an image processing method and apparatus for halftone image reproduction.

In the halftone reproduction process, such as that described by Stoffel, there are two kinds of Moire interference patterns. One is the input scanning Moire and the other is the output printing Moire. Since the halftone image is composed of many microdots that are regularly placed in the image, this halftone "dot structure" interacts with a regular pitched sampling process in the scanner operation. The resultant scanning Moire patterns are imbedded in the digital image and are carried through the image processing chain, thereby producing undesirable artifacts on the final printed image.

The output printing Moire is different from the input scanning Moire. It is caused by the interference between the halftone dot structure in the image and the output halftone dot structure created in the normal digital halftoning process. This printing interference Moire is more severe than the scanning interference Moire as far as image degradation is concerned. While the printing Moire problem has been addressed elsewhere, the scanning Moire pattern has not been addressed for the halftone reproduction process.

SUMMARY OF THE INVENTION

There is a need for an improved method to reduce the cross interference (Moire pattern) in the reproduction of a scanned halftone image.

This and other needs are met by the present invention which provides a method and apparatus for reducing cross-interference in the reproduction of an image, the method comprising the steps of receiving a grey level value for each of a plurality of original pixels of an image, sub-dividing the plurality of original pixels into groups of original pixels, with each group of original pixels defining a boundary, and locating a new pixel within a boundary of each group. Interpolation is performed among the original pixels of each group to produce a grey level value for the new pixel located within that group. The original pixels of each group are replaced with the new pixels to form a modified image.

The above stated needs are also met by a method of reproducing an image, comprising the steps of scanning an original image to produce a digital representation of the original image as a plurality of original pixels regularly located within the original image and each having a grey level value, generating replacement pixels located within boundaries of the original image, performing interpolation of the grey level values of the original pixels and assigning an interpolated grey level value to each of the replacement pixels, and generating a reproduction of the original image using only the replacement pixels and their assigned interpolated grey level values.

In accordance with another aspect of the invention, there is provided in a method of halftone scanning a document having a plurality of pixels, the improvement comprising the steps of generating new pixels from groups of the pixels, randomly locating the new pixels, and applying bilinear interpolation to generate grey level values for the new pixels.

The use of the method of the present invention resamples the image in such a way so as to break up Moire structure so that it is no longer visible. However, the method also preserves important image and edge information.

Other objects, advantages and novel features of the present invention will become apparent from the following detailed description of the invention when considered in conjunction with the accompanying drawings.

DETAILED DESCRIPTION OF THE DRAWINGS

Figure 1:
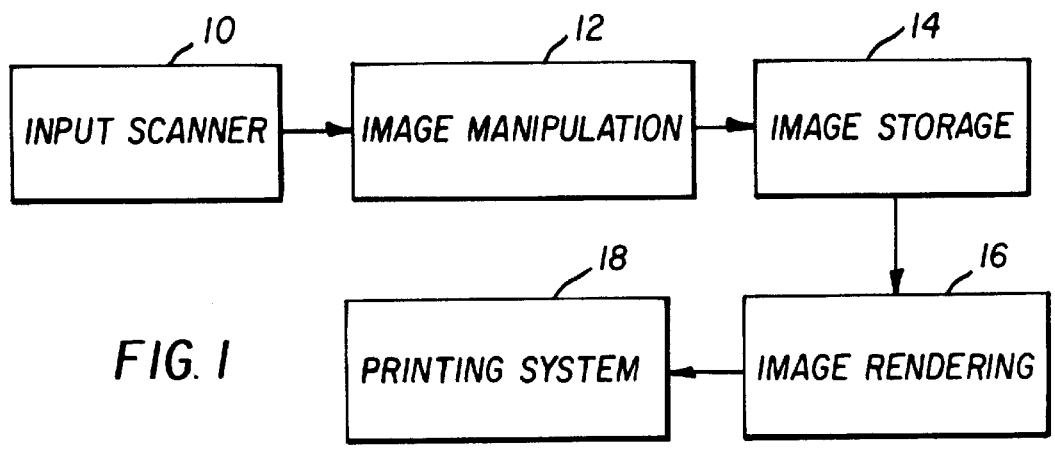
FIG. 1 shows a block diagram of a document copying/printing system constructed in accordance with an embodiment of the present invention.

FIG. 1 illustrates in block diagram form a document copying/printing system constructed in accordance with the embodiment of the present invention. The system includes an input scanner 10 which scans a document and digitizes that document. Signals from the input scanner 10 are fed to an image manipulation unit 12 which performs the modification of the image as described in the present invention. As the image manipulation unit, a conventional image processor that performs the method of the present invention may be used. As will be appreciated from the following description, one of ordinary skill in the art can readily implement the method of the present invention on a conventional image processor which may include dedicated circuits or one or more suitably programmed computers.

After the image has been manipulated by the image manipulation unit 12, the image is sent to the image storage unit 14, which may store the image indefinitely, or provide it to an image rendering unit 16. A grey scale; i.e., multibits per pixel grey level system, printing system 18 receives the image from the image rendering unit, which receives the image from the image storage unit 14 and prepares it for printing by the printing system 18. Typical grey scale printers are LEDs, lasers used in electrophotographic or photographic systems, electrographic writers, ink jet or thermal printers.

Figure 4:
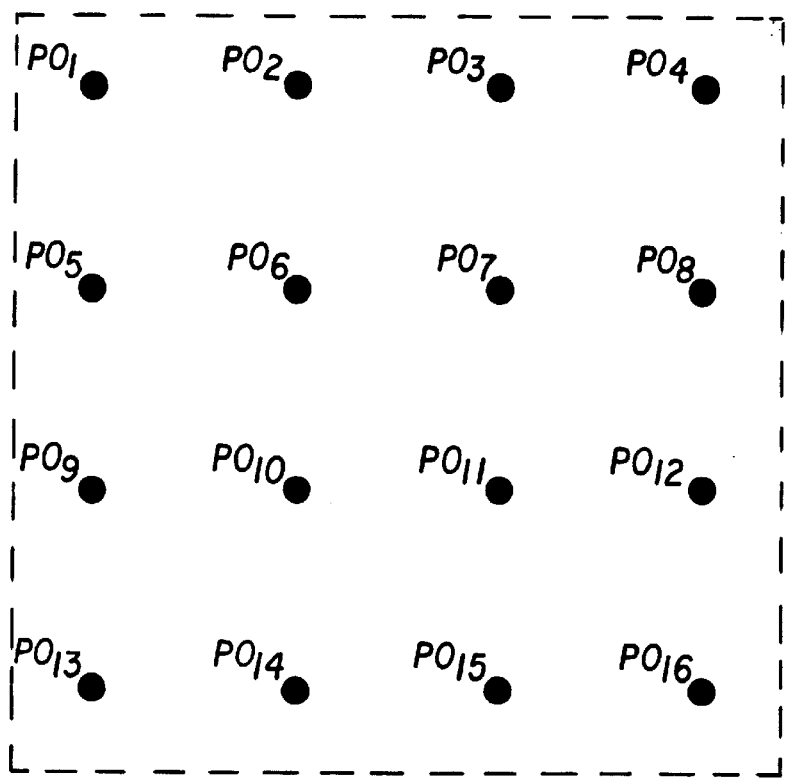
FIG. 4 illustrates a plurality of pixel points in an unmodified image.

The image of the document that has been scanned for the input scanner 10 comprises a plurality of regularly spaced input pixels and can be, for example, a grid as shown in FIG. 4. Each pixel has a certain corresponding grey level.

The image manipulation unit 12 of the present invention resamples the image in such a way as to breakup the Moire structure so that it is no longer visible, but at the same time preserves the image and edge information. To do this, new samples are generated from a group or cluster of existing pixels by randomly locating these new pixels and then applying bilinear interpolation accordingly.

Bilinear interpolation is a popular technique to enlarge or zoom digital images. It is an optimal interpolator for a linear function (function with first order) and is less expensive to implement than other higher order interpolators. In bilinear interpolation, a weighted average (low-pass filter effect) of the relevant neighboring input pixel values is used to construct new output pixel values. The inherent smoothing effect of the bilinear interpolation scheme tends to smooth out edges but preserve structure in the new image. With the present invention, however, the image is not zoomed, but instead is resampled. A one-dimensional linear interpolation illustration is provided in FIG. 2 and described below.

The one-dimensional case will first be described for reasons of simplicity, however, the present invention when actually used will operate in two-dimensions. The bilinear interpolation function is a straightforward extension of this one-dimensional linear interpolation function.

Figure 2:
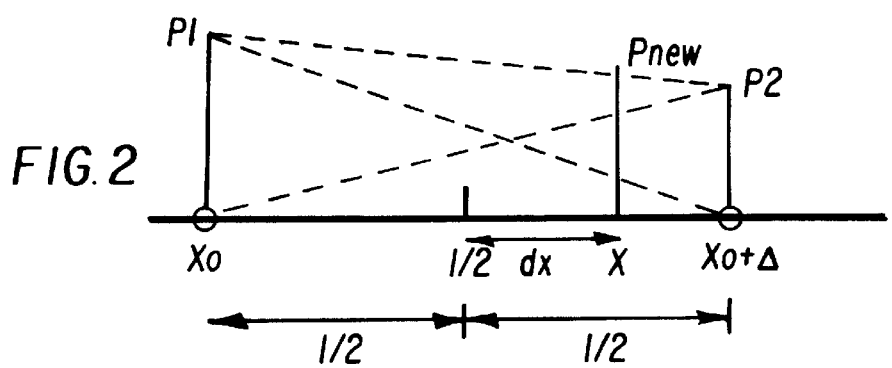
FIG. 2 shows a graphic depiction of a one-dimensional linear interpolation example.

Assume there are two pixels Xo and Xo+Δ. The value of these pixels are indicated as: P(Xo) and P(Xo+Δ). These are shown in FIG. 2. A new pixel X located between them has a value of P(X). The height of the line in FIG. 2 corresponds to the value of the pixel P(X). The linear interpolation function can be expressed as follows:

$$P(X)=[(Xo+\Delta-x)/\Delta]*P(Xo)+[(X-Xo)/\Delta]*P(Xo+\Delta) \quad (1)$$

Letting X=Xo+Δ/2 (the midway point), and P1=P(Xo), P2=P(Xo+Δ), P=P(X), the new pixel becomes the simple average of the original two pixels:

$$P=Pavg=(P1+P2)/2 \quad (2)$$

Now, if the location of the new pixel is perturbed by a distance dx from the midway point: (i.e. −0.5*Δ<dx<0.5*Δ)

$$Pnew=[(\Delta/2-dx)/\Delta]*P1+[(\Delta/2+dx)/\Delta]*P2 \quad (3)$$

or $$Pnew=Pavg+(dx/\Delta)*(P2-P1) \quad (4)$$

or $$Pnew/Pavg=1+(dx/\Delta)*[(P2-P1)/Pavg] \quad (5)$$

The second term in equation (4) carries edge or image structure information not found in a simple average, while the same part in the second term in equation (5) is the definition of contrast on the current pixel. In certain preferred embodiments, the perturbation value dx is chosen as fixed relative to the contrast, so that its variation is proportional to the local average. Since the value dx is varied and bounded within a value one-half, the new pixel value Pnew will also be bounded between two values P1 and P2. The new image structure is therefore being altered from pixel to pixel to break up any unwanted imbedded structure.

Figure 3:
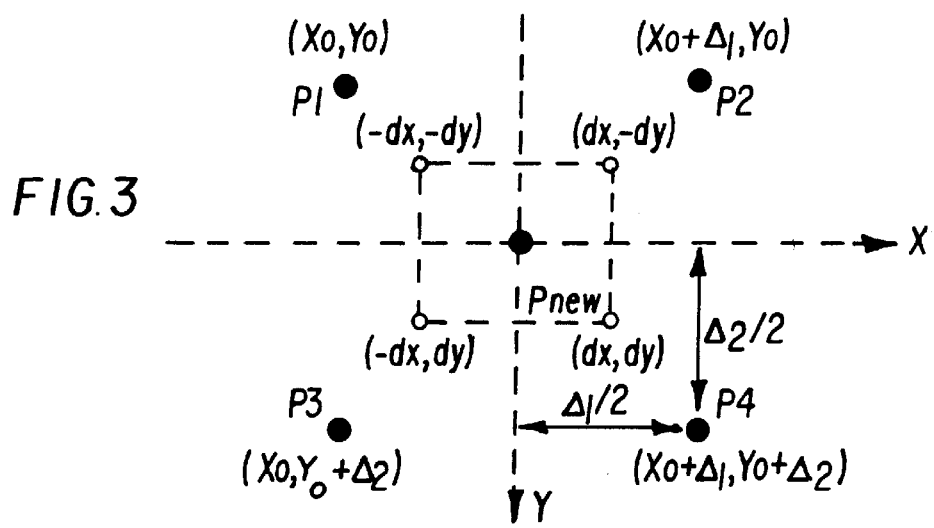
FIG. 3 shows a graphic depiction of a two-dimensional bilinear interpolation example.

The above linear case can be expanded to two dimensions, with a schematic illustration of the replacement of four pixels by a single new pixel being shown in FIG. 3. Assume a 2×2 window (four neighboring pixels): P(Xo,Yo), P(Xo+Δ$_1$, Yo), P(Xo,Yo+Δ$_2$) and P(Xo+Δ$_1$, Yo+Δ$_2$). The new pixel to be calculated, P(X,Y), is located somewhere in the window. The bilinear interpolation function can be expressed as follows:

$$P(X,Y) = [(Xo+\Delta_1-X)/\Delta_1]*[(Yo+\Delta_2-Y)/\Delta_2]* \quad (6)$$
$$P(Xo,Yo)+[(X-Xo)/\Delta_1]*[(Yo+\Delta_2-Y)/\Delta_2]*$$
$$P(Xo+\Delta_1,Yo)+[(Xo+\Delta_1-X)/\Delta_1]*$$
$$[(Yo-Y)/\Delta_2]*P(Xo,Yo+\Delta_2)+[(X-Xo)/\Delta_1]*$$
$$[(Y-Yo)/\Delta_2]*P(Xo+\Delta_1,Yo+\Delta_2)$$

The function is linear in the X and Y directions, but quadratic along the diagonals. Again, let X=Xo+Δ$_1$/2 and Y=Yo+Δ$_2$/2, as well as P1=P(Xo,Yo), P2=P(Xo+Δ$_1$, Yo), P3=P(Xo, Yo+Δ$_2$), P4=P(Xo+Δ$_1$, Yo+Δ$_2$), and P=P(X,Y). The new pixel is located exactly in the middle of the window and its value becomes the simple average of the four pixels:

$$P=Pavg=(P1+P2+P3+P4)/4 \quad (7)$$

If the location of P is perturbed from the middle by a distance of dx in the x-direction and dy in the y-direction (i.e.; −0.5*Δ$_1$<dx<0.5*Δ$_1$; −0.5*Δ$_2$<dy<0.5*Δ$_2$), then the following is attained:

$$Pnew = \{[\Delta_1-(\Delta_1/2+dx)]*[\Delta_2-(\Delta_2/2+dy)]*P1+ \quad (8)$$
$$(\Delta_1/2+dx)*[\Delta_2-(\Delta_2/2+dy)]*P2+$$
$$[\Delta_1-(\Delta_1/2+dx)]*(\Delta_2/2+dy)*P3+$$
$$(\Delta_1/2+dx)*(\Delta_2/2+dy)*P4\}/(\Delta_1*\Delta_2)$$

or $$Pnew=Pavg+[(dx/2)*\Delta_1]*[(P2-P1)+(P4-P3)]+[(dy/2)*\Delta_2]*[(P3-P1)+(P4-P2)]+(dx/\Delta_1)*(dy/\Delta_2)*(P1+P4-P2-P3) \quad (9)$$

The second term in equation (9) carries vertical edge structure information, the third carries horizontal edge structure information, and the fourth carries diagonal structure information. The distances dx and dy are varied according to their contrast (similar to the one-dimensional example), which breaks up the Moire structure but preserves the image content.

By varying dx and dy as described above, scanning Moire structure in halftone images is significantly reduced. The visual artifacts are reduced but the original halftone screen structure is preserved.

The above analysis has been simplified for illustration purposes so that the location of Pnew is perturbed from the middle of a 2×2 pixel window by some distance in both the x-direction and the y-direction. Those skilled in the art will recognize that this method can be extended to other locations within the 2×2 window or even larger windows.

The distances dx and dy must be chosen properly from pixel to pixel. If the variation of dx and dy from pixel to pixel is completely random within the specified window, the scanning Moire structure is broken up completely. However, complete randomness of dx and dy also injects white noise into the original halftone structure which causes the image to appear grainy. It is important to reduce the amount of white noise before further enhancement and rendering in the subsequent document processing chain.

One way to reduce this white noise is to restrict dx and dy to a finite number of points within the 2×2 window. For example, four symmetric fixed points can be chosen, then dx and dy varied randomly so as to choose one of the four points. This is illustrated in FIG. 3. This restriction reduces the variance of the added noise, but breaks up the Moire structure, giving the image a more visually-pleasing appearance. Those skilled in the art will also recognize that the selection of the fixed points can be extended to any symmetric structure within the 2×2 window or a larger window. Thus, a circle or other geometric figure may be used having say 4 or more fixed points with the fixed points selected randomly.

Figure 5:
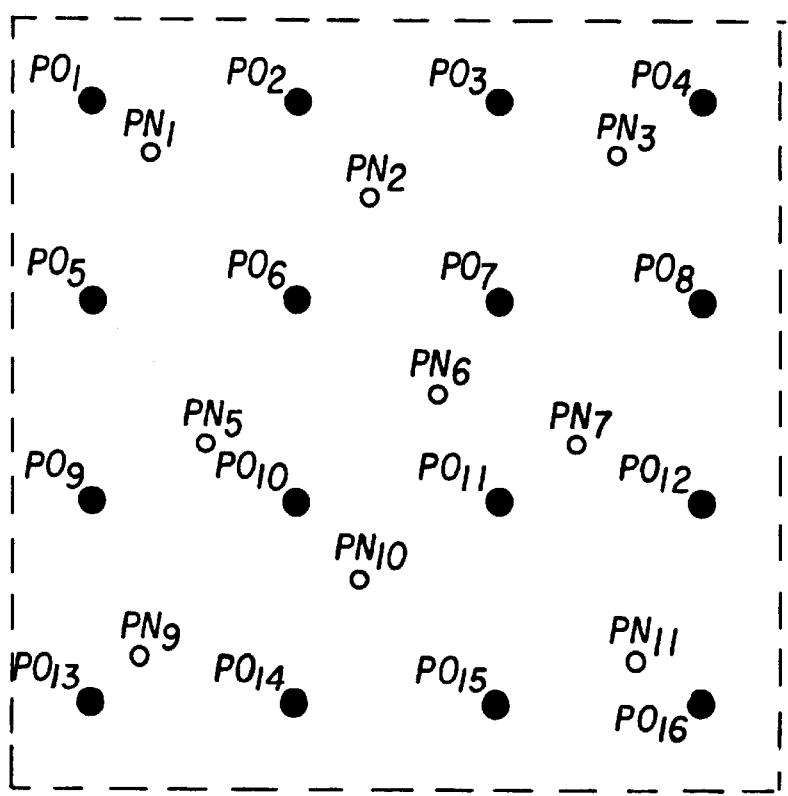
FIG. 5 illustrates the unmodified pixel points of FIG. 4, with the new interpolated points.
Figure 6:
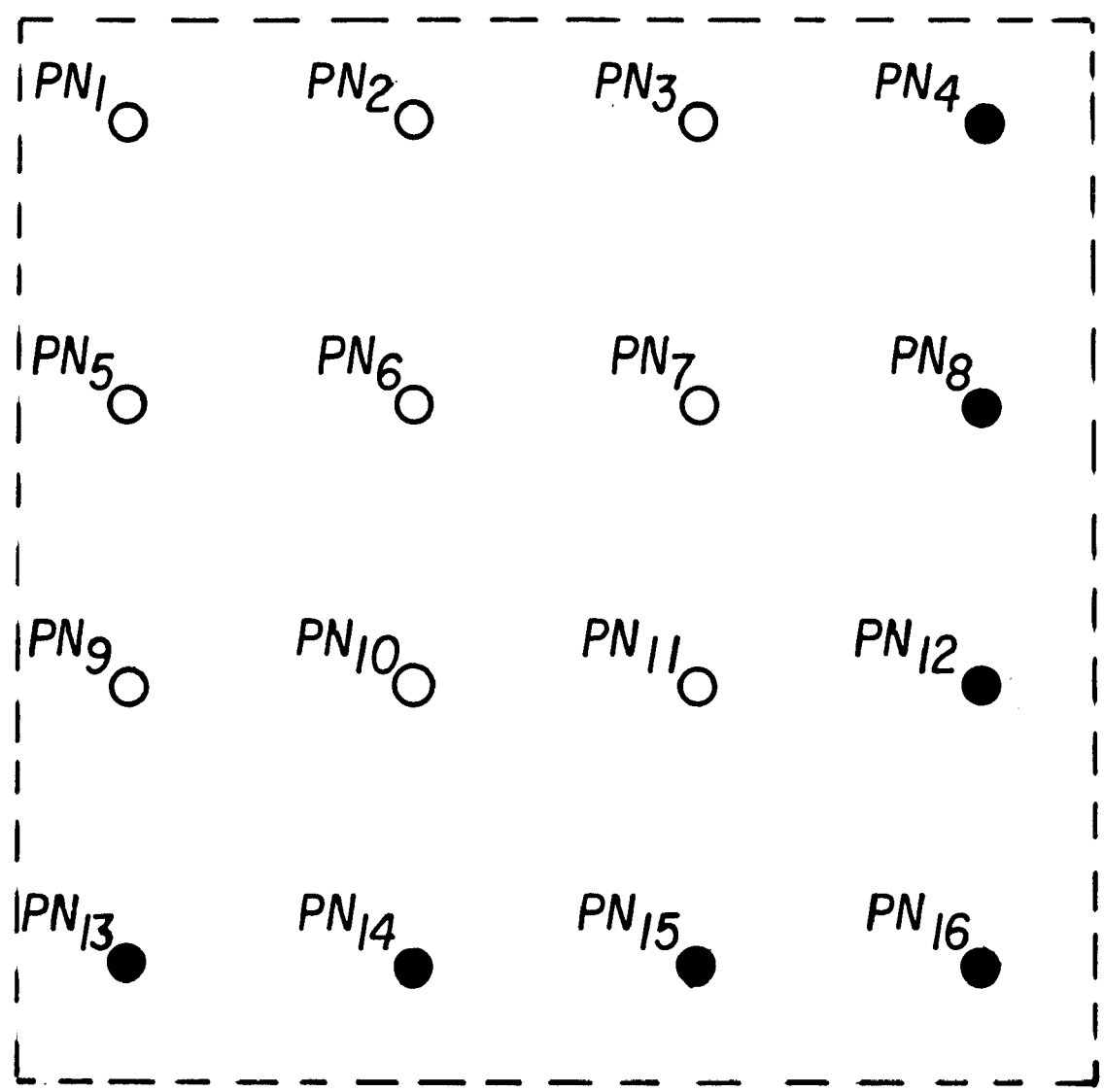
FIG. 6 shows the interpolated points that have replaced the original points of FIG. 4 in a modified image.

FIGS. 4–6 schematically show how the replacement process works according to the present invention.

FIG. 4 illustrates a plurality of original pixels $PO_1$–$PO_{16}$ that forms part of an image of the document that has been scanned by the input scanner 10 and sent to the image manipulation unit 12. The original pixels $PO_1$–$PO_{16}$ are regularly spaced in a grid pattern, although other types of spacings are possible. Each of the pixels $PO_1$–$PO_{16}$ have a corresponding grey level.

Using the bilinear interpolation method illustrated in FIG. 3 and described above, groups or clusters of these original pixels $PO_1$–$PO_{16}$ are replaced with a new pixel $PN_1$.

A juxtaposition of the original pixels $PO_1$–$PO_{16}$ with the new pixels $PN_1$–$PN_{16}$ which will replace the original pixels $PO_1$–$PO_{16}$ is illustrated in FIG. 5. The grey level value of new pixel $PN_1$ is determined by a bilinear interpolation of the original pixels $PO_1$, $PO_2$, $PO_5$ and $PO_6$. Similarly, the new pixel $PN_2$ constructs from original pixels $PO_2$, $PO_3$, $PO_6$ and $PO_7$. The extension to new pixels $PN_3$, . . . $PN_{11}$ should be apparent from this example. Those boundary pixels at the last column and the last row of the image maintain their original pixel values unchanged (see $PN_4$, $PN_8$, $PN_{12}$, $PN_{13}$–$PN_{16}$ in FIG. 6).

The illustration of FIG. 5 shows the variation of the location of the new pixel $PN_1$ within the window formed by the four original pixels that the new pixel replaces. This breaks up the Moire structure, and gives the image a more visually pleasing appearance. This embodiment also illustrates how the random locations are restricted to one of a predetermined number of points.

FIG. 6 illustrates the resampled image after the new pixels $PN_1$–$PN_{16}$ have replaced the original pixels $PO_1$–$PO_{16}$. This modified image, represented by the new pixels $PN_1$–$PN_{16}$ of FIG. 6, is sent by the image manipulation unit 12 to the image storage unit 14, from which the image can then be sent to the image rendering unit 16 to be printed by the printing system 18. This modified image will have a reduced cross interference (Moire) caused by the scanning input process.

Figure 7:
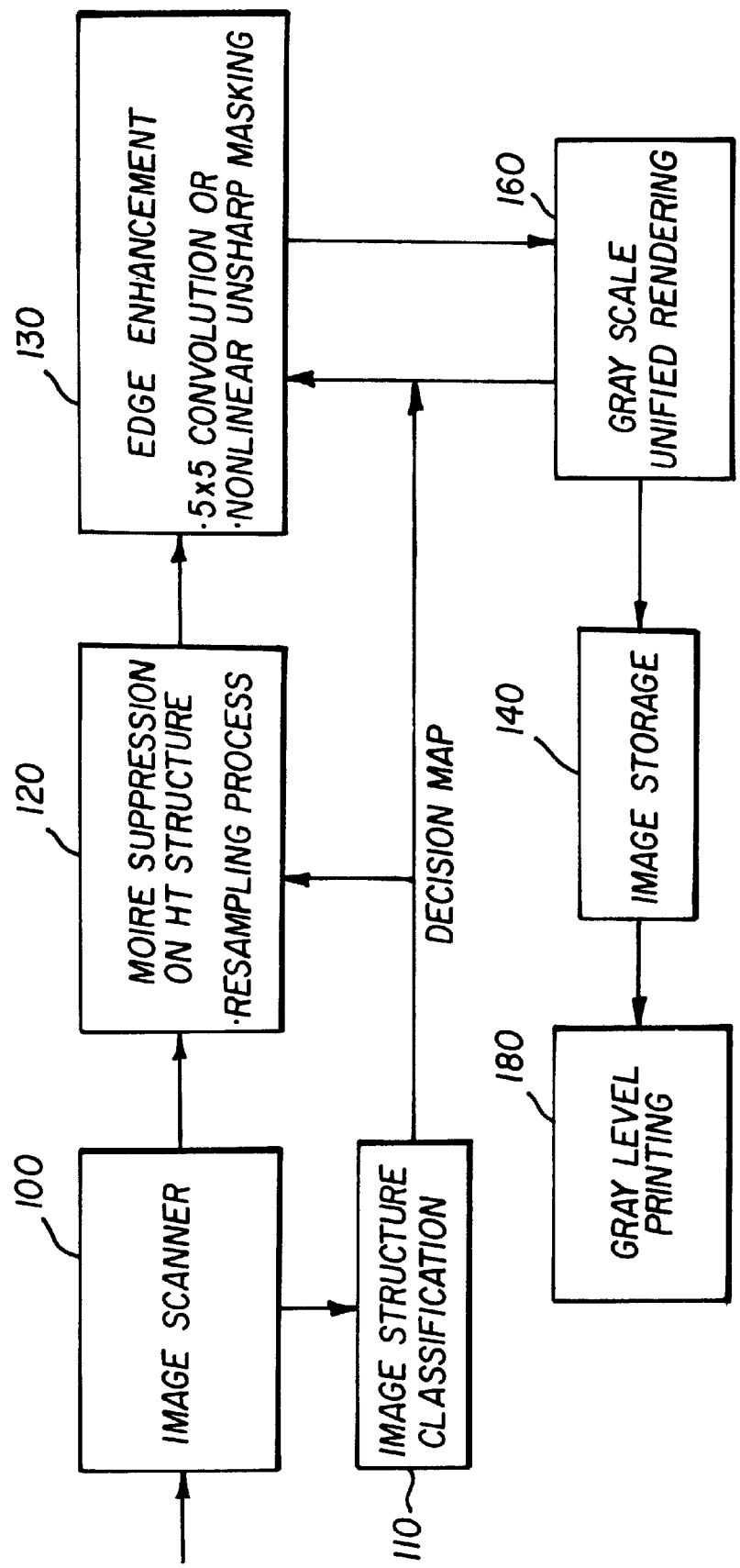
FIG. 7 shows a block diagram of an alternate document copying/printing system constructed in accordance with another embodiment of the invention.

The improved resampling method described above illustrates how to break up the scanning Moire structure in a scanned halftone image. An alternative embodiment of a copier incorporating the resampling method will also now be described with reference to the apparatus of FIG. 7. A document in a normal printing job stream may contain several image types such as text, line drawing, halftone picture and continuous tone picture in one page. Different image types have different processing requirements associated with them for optimal image quality reproduction. A circuit or operator 110 generates a pixel decision map. This decision map is then processed into a rectangular region (represented by four corner points) representation to guide subsequent processing. Those regions being classified as halftone will be processed with the Moire suppression circuit or operator 120 as previously described. Other regions/pixels classified into other images types will not be affected by the Moire suppression operation. Further regional type based processing (i.e., edge enhancement, compression, and grey scale rendering) is operated according to each image type by circuit or operator 130. The rendered document can then be made ready for grey scale printing in accordance with a grey scale unified rendering circuit or operator. An example of such is disclosed in U.S. Pat. No. 5,200,831, the pertinent contents of which are incorporated herein by reference. Before and/or after unified rendering the data may be stored in a storage device or memory 140 and then printed by a grey level printer.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of processing data generated by scanning an original halftone image pattern, the data being in the form of a set of original grey level pixels having a predetermined resolution and scale, the method comprising the steps of:
    a) forming a window comprised of a group of neighboring original pixels;
    b) generating a grey level value for a new pixel which grey level value is determined by a linear interpolation of the neighboring original pixels comprising the window wherein the linear interpolation is dependent upon grey level values of the said neighboring original pixels and distances between the said neighboring original pixels;
    c) replacing one of said neighboring original pixels in the group formed in step (a) with the new pixel having the grey level value generated in step (b);
    (d) repeating steps (a), (b) and (c) plural times using different groups of neighboring original pixels to generate a new set of grey level pixels having said predetermined resolution and scale; and
    (e) using said new set of grey level pixels to form a modified image of the original image.

2. The method of claim 1 and wherein in step (b) the interpolation is bilinear.

3. The method of claim 2 and wherein the window is a 2×2 window of four neighboring pixels.

4. The method of claim 3 and wherein in step (b) the bilinear interpolation is further dependent upon factors related to distances of said neighboring pixels from a first point located proximate to but not at a center point between the four neighboring pixels.

5. The method of claim 4 and including changing a location of said first point relative to said center point when repeating steps (a), (b) and (c).

6. The method of claim 5, wherein the step of interpolating is in accordance with the equation:

$$P\text{new}=P\text{avg}+((dx/2)*\Delta_1)*((P2-P1)+(P4-P3))+((dy/2)*\Delta_2)*((P3-P1)+(P4-P2))+(dx/\Delta_1)*(dy/\Delta_2)*(P1+P4-P2-P3)$$

where Pnew is the grey level value of the new pixel; Pavg is the average of the grey level values of the of the four neighboring original pixels comprising the window; P1, P2, P3, and P4 are the respective grey level values of the original pixels of the group; $\Delta_1$ is the distance between original pixels of the group in a first direction; $\Delta_2$ is the distance between original pixels of the group in a second direction: dx is a distance value in the first direction of said first point from said center point and dy is a distance value of said first point from said center point in the second direction.

7. A method of processing an original halftone image represented by a set of original grey level pixels so as to generate a set of new grey level pixels at the same scale as the set of original grey level pixels, the method comprising:

(a) determining a grey level value for each new grey level pixel as a function of (i) grey level values of original pixels in a group of plural neighboring original pixels, and (ii) spacings between said neighboring original pixels;

(b) replacing an original grey level pixel, forming part of the group of neighboring original pixels, with the grey level value determined in accordance with step (a); and (c) repeating steps (a) and (b) using different groups of plural neighboring original pixels to generate a set of new grey level pixels that are at the same scale as the set of original grey level pixels.

8. The method of claim 7 and including the step of generating the set of original grey level pixels by scanning a document having the halftone image.

9. The method of claim 8 and wherein the group of original pixels is a 2×2 subset of four pixels.

10. The method of claim 9 and wherein the function in step (a) is also dependent upon factors related to distance of said neighboring pixels from a point located proximate to but not at a center point between the four neighboring pixels.

11. The method of claim 10 and including changing a location of the point relative to the center point when repeating steps (a) and (b).

\* \* \* \* \*

UNITED STATES PATENT AND TRADEMARK OFFICE
CERTIFICATE OF CORRECTION

PATENT NO. : 6,411,745 B1  
DATED : June 25, 2002  
INVENTOR(S) : Hwi-Tzuu Tai et al.

It is certified that error appears in the above-identified patent and that said Letters Patent is hereby corrected as shown below:

<u>Title page,</u>
Item [*] Notice, delete "0" and insert -- 1606 --.

Signed and Sealed this

Sixteenth Day of March, 2004

JON W. DUDAS
*Acting Director of the United States Patent and Trademark Office*